(12) United States Patent
Zander

(10) Patent No.: US 12,129,946 B2
(45) Date of Patent: Oct. 29, 2024

(54) PROTECTIVE BRACKET FOR LOADER HOSE LINES

(71) Applicant: Dustin C. Zander, Maple Lake, MN (US)

(72) Inventor: Dustin C. Zander, Maple Lake, MN (US)

(73) Assignee: Dustin Zander, Maple Lake, MN (US)

( * ) Notice: Subject to any disclaimer, the term of this patent is extended or adjusted under 35 U.S.C. 154(b) by 0 days.

(21) Appl. No.: 17/863,285

(22) Filed: Jul. 12, 2022

(65) Prior Publication Data
US 2023/0017880 A1 Jan. 19, 2023

Related U.S. Application Data

(60) Provisional application No. 63/220,607, filed on Jul. 12, 2021.

(51) Int. Cl.
*F16L 3/26* (2006.01)
*E02F 9/08* (2006.01)
*F16L 3/23* (2006.01)

(52) U.S. Cl.
CPC .............. *F16L 3/26* (2013.01); *E02F 9/0808* (2013.01); *F16L 3/23* (2013.01)

(58) Field of Classification Search
CPC ........ B60D 1/62; E02F 9/2275; E02F 9/0808; F16L 3/1016; F16L 3/10; F16L 3/22; F16L 3/237; F16L 3/23; F16L 3/26
USPC ............................................... 248/49, 71, 73
See application file for complete search history.

(56) References Cited

U.S. PATENT DOCUMENTS

| 2,026,312 | A | * | 12/1935 | Houts | F16L 3/23 |
| | | | | | 24/522 |
| 2,619,888 | A | | 12/1952 | Young et al. | |
| 2,626,552 | A | | 1/1953 | Oehler et al. | |
| 2,879,020 | A | | 3/1959 | Wheeler | |
| 3,132,831 | A | * | 5/1964 | Stamper | H03K 5/02 |
| | | | | | 248/74.1 |
| T974,001 | I4 | | 9/1978 | Neal | |
| 4,156,436 | A | | 5/1979 | Hauk | |
| 4,265,063 | A | | 5/1981 | Muller | |
| 4,267,674 | A | | 5/1981 | Muller | |
| 4,658,854 | A | | 4/1987 | Hopkins et al. | |
| 4,955,455 | A | | 9/1990 | Albright et al. | |
| 5,236,158 | A | * | 8/1993 | Condon | F16L 3/24 |
| | | | | | 248/62 |

(Continued)

*Primary Examiner* — Christopher Garft
(74) *Attorney, Agent, or Firm* — Christensen, Fonder, Dardi & Herbert PLLC; Andrew H. Auderieth; Douglas J. Christensen

(57) ABSTRACT

A hose guard for a skid loader attachment includes an axial elongate rigid enclosure defining a central cavity, the elongate rigid enclosure having an opening at a first end and an opening at a second end. A first attachment means at the first end of the elongate rigid enclosure is configured to secure the first end of the elongate rigid enclosure to the skid loader. A second attachment means at the second end of the elongate rigid enclosure is configured to secure the second end of the elongate rigid enclosure to the skid loader whereby the elongate rigid enclosure is readily attachable and removable from the skid loader facilitating removing and exchanging different skid loader attachments, and the elongate rigid enclosure has limited freedom of motion during operation of the skid loader and attachment.

20 Claims, 4 Drawing Sheets

(56) References Cited

U.S. PATENT DOCUMENTS

| | | | |
|---|---|---|---|
| 6,095,181 A | 8/2000 | Irwin | |
| 7,156,200 B2 | 1/2007 | Dershem et al. | |
| 7,631,446 B1 | 12/2009 | Davis | |
| 8,246,287 B1 | 8/2012 | Westendorf | |
| 8,408,862 B1 | 4/2013 | Westendorf | |
| 10,648,158 B1 | 5/2020 | Smith | |
| 10,801,185 B2 | 10/2020 | Ramous | |
| 10,995,477 B2 | 5/2021 | Lewis | |
| 2013/0048826 A1* | 2/2013 | Go | F16L 3/237 248/560 |
| 2015/0001351 A1* | 1/2015 | Krager | H02G 3/32 248/49 |
| 2021/0087788 A1 | 3/2021 | Durkin et al. | |
| 2021/0275847 A1* | 9/2021 | Hofstrand | A62C 33/04 |
| 2021/0407703 A1* | 12/2021 | Rouleau | H02G 3/32 |

* cited by examiner

--Prior Art--

PROTECTIVE BRACKET FOR LOADER HOSE LINES

RELATED APPLICATIONS

The present application claims the benefit of U.S. Provisional Patent Application No. 63/220,607, filed Jul. 12, 2021, the disclosure of which is incorporated by reference herein in its entirety.

FIELD OF THE INVENTION

This invention relates to structures for routing hydraulic hose lines on motorized vehicles. More particularly, this invention relates to protecting exposed hose lines from damage during operation of the vehicle. Even more particularly, this invention to relates to a rigid structure that protects hydraulic hose lines used for motorized vehicles having arms configured to attach to a variety of hydraulic tools or attachments.

BACKGROUND OF THE INVENTION

Skid loaders, skid steers, or the like are popular motorized vehicles used for construction, farming, landscaping, and the like. Skid loaders may have wheels or tracks. Skid loaders are generally compact and maneuverable, making them desirable vehicles to use in a variety of rough environments. Skid loaders typically have arms that connect to hydraulic tools or attachments such as, for example, buckets, augers, tillers, brush cutters, brooms, chippers, and saws. Flexible hydraulic hose lines are connected between the vehicle and the attachment, allowing the operator to power and control the attachments. However, loose hanging hoses may be entangled and snared by the attachments particularly during exchange of attachments. Further, as skid loaders are often used in rough environments such as dense brush and thickets, or construction sites, exposed hydraulic hose lines may be damaged during vehicle use resulting in added expense for repairs and lost time when the vehicle is inoperable.

SUMMARY OF THE INVENTION

Routing the lines away from the ground or skid loader, such as keeping the lines clear from the tracks or wheels, still leaves the lines exposed to foreign objects during operation of the vehicle. Such exposure still allows protruding objects, such as brush, to tear the hose lines. See U.S. Pat. Nos. 2,619,888; 2,626,552; 2,879,020; and 10,648,158, all of which are incorporated by reference herein for all purposes. An invention that protects skid loaders' hydraulic hose lines from external damage would be well received by the industry.

A hose guard for a skid loader attachment includes an elongate rigid enclosure with a central cavity and an axis, the elongate rigid enclosure having an opening at a first end and an opening at a second end. A first attachment means at the first end of the elongate rigid enclosure is configured to secure the first end of the elongate rigid enclosure to the skid loader. A second attachment means at the second end of the elongate rigid enclosure is configured to secure the second end of the elongate rigid enclosure to the skid loader. A holder is affixed to a sidewall of the elongate rigid enclosure between the first and second ends.

In embodiments, the first attachment means is a hook. In embodiments, the second attachment means is a stub of pipe defining an opening or aperture, wherein the stub of pipe is configured to interface with the skid loader such that placing a pin through the aperture secures the stub of pipe to the skid loader. In embodiments, a cross section of the elongate rigid enclosure is circular. In embodiments, a cross section of the elongate rigid enclosure is rectangular.

In embodiments, the elongate rigid enclosure includes a first C-channel and a second C-channel, each of the C-channels having a back side and two legs forming a "C" shape. The back side and two legs of the second C-channel each have a length shorter than the corresponding back side and two legs of the first C-channel, such that the two legs of the second C-channel fit within the two legs of the first C-channel. In embodiments, an interior cavity of the of the elongate rigid enclosure is defined by the back side of the first C-channel, the back side of the second C-channel, and overlapping portions of the legs of the first and second C-channels. In embodiments, the first and second C-channel are secured to one another with one or more removable fasteners. In embodiments, the one or more removable fasteners are bolts. In embodiments, the elongate rigid enclosure is rigid. In embodiments, the elongate rigid enclosure is metal. In embodiments, the elongate rigid enclosure is steel. In embodiments, the elongate rigid enclosure is non-apertured.

In embodiments, the holder is a pipe affixed to an outward facing side of the elongate rigid enclosure. In embodiments, a central axis of the holder is perpendicular to a central axis of the elongate rigid enclosure.

A universal rigid hose guard for protecting hydraulic hose lines of a skid steer between a skid steer hose line attachment point and a pivot point at a bottom of a skid steer loader arm includes a column having an open top end and an open bottom end. The column defines an interior chamber, such that the hydraulic hose lines of the skid steer enter the chamber through the top end and exit through the bottom half. A hook extends upwardly from the top end of the column. A cylindrical protrusion extends radially outward from the bottom end of the column. The protrusion has a wall defining a first hole opposite a second hole. The protrusion interfaces with a cylindrical stub on an exterior surface of the skid loader. The stub has a first hole opposite a second hole, such that, when interfaced, the holes axially align and a pin positioned in the aligned holes secures the cylindrical protrusion to the cylindrical stub. The cylindrical stub may be secured such as by welding, on each of a variety of attachments to the skid loader and provides a pivot point of the elongate rigid enclosure allowing the housing to move during operation of the skid loader and attachment while keeping the hydraulic hose lines protected from entanglement or damage from the moving attachment, the skid loader tracks, or from external objects or debris.

In embodiments, the cylindrical protrusion has a larger diameter than the cylindrical stub such that the stub fits within a portion of the protrusion. In embodiments, the cylindrical protrusion has a smaller diameter than the cylindrical stub such that a portion of the protrusion fits within the stub.

A feature and advantage of embodiments of the invention is a rigid structure that protects the hose lines from foreign objects. A feature and advantage of embodiments of the invention is a solid structure that is generally impervious to rigid foreign objects. A feature and advantage of embodiments of the invention is the ability to route and/or secure hose lines and operate the vehicle without causing or allowing kinks or other damage to the lines. Kinked hose lines reduce efficiency, render the lines inoperable, or place stress on the lines which will ultimately lead to structural failure such as cracks or tears in the line. A further feature and advantage of embodiments of the invention is the ability for a single user to install the hose guard without assistance.

A method of using a universal rigid hose guard includes hanging the hook from the loader; positioning the cylindrical stub and the cylindrical protrusion to be coaxial with one another; placing a pin through the holes of the stub and the protrusion; and placing the hydraulic hose lines within the column such that a first connection point extends above the top end of the column and a second connection point extends below the bottom end of the column. A method of using the universal rigid hose guard further includes affixing the first connection point of the hydraulic hose lines to a corresponding connection on the loader. A method of using the universal rigid hose guard further includes affixing the second connection point of the hydraulic hose lines to a corresponding connection on a hydraulic skid loader attachment. A method of using the universal rigid hose guard further includes placing at least the first or second connection points of the hydraulic hose lines through a holder affixed to an exterior wall of the column. A method of using the universal rigid hose guard further includes tightening one or more bolts on the column thereby clamping the hydraulic hose lines and preventing them from sliding within the column.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
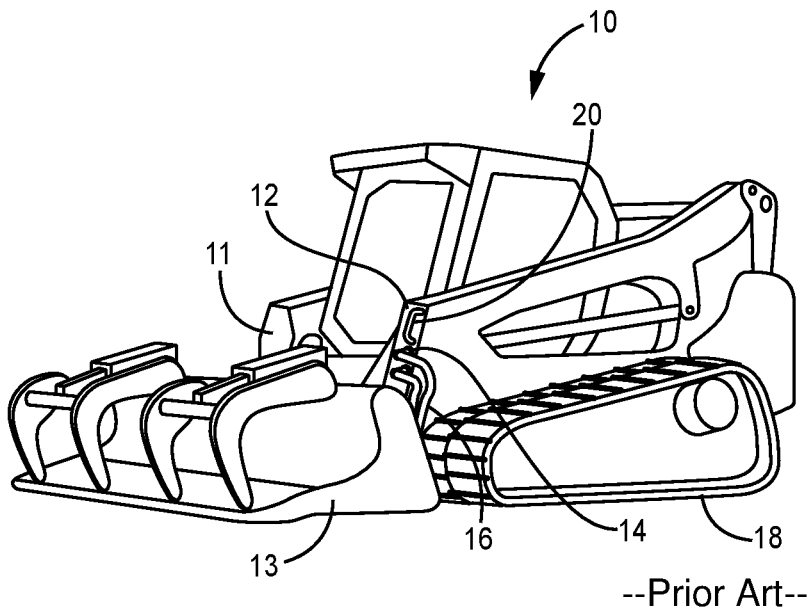
FIG. 1A is a perspective front view of a track skid steer with loose hose lines connecting an arm of the skid steer to a grapple bucket.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION OF THE INVENTION

A protective bracket is described herein that provides devices and methods for protecting hydraulic hose lines used to connect attachments to a motorized vehicle. The protective bracket can be easily installed by a single user using two hands. The rigid structure of the bracket has an open interior through which hose lines may be routed. The rigid structure protects the hose lines between the connection point on the motorized vehicle and the connection point on the attachment, permitting the vehicle to be operated in harsh environments such as dense brush while reducing the risk of damage to the lines.

Figure 1B:
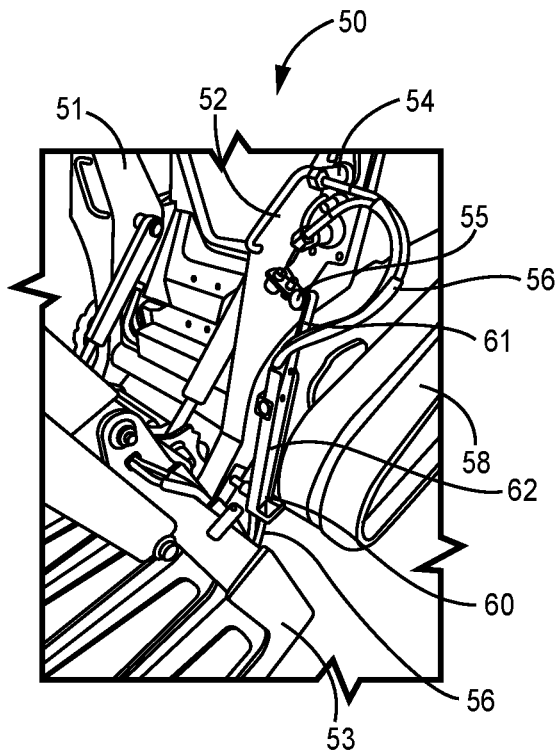
FIG. 1B is an enlarged front view of a portion of a track skid steer loader with hose lines protected by a hose guard according to embodiments of the invention.

FIG. 1A illustrates a track skid steer 10 with arms 11, 12 connected to a grapple bucket 13. Left arm 12 has hydraulic ports 14 and hose lines 16 connecting the hydraulic ports to the grapple bucket. See, for example, U.S. Pat. No. 7,631,446, which is incorporated by reference herein for all purposes. Hose lines 16 are generally loose and exposed. As such, the hose lines are prone to damage by external objects, debris extended from the grapple bucket, or even from getting tangled in the tracks 18. In the example skid steer shown, handle 20 offers a point from which to hang a protective bracket according to embodiments of the invention described in detail below. FIG. 1B depicts a partial front perspective view of an alternative embodiment of a track skid steer loader 50 with arms 51, 52 connected to a grapple rake 53. Left arm 52 has hydraulic ports 54 connected to hose lines 56. A bracket 55 is secured to the left arm 52 near hydraulic ports 54 allowing an arm 61 of hose guard 60 to be easily mounted to the vehicle. Accordingly, hose lines 56 are protected by routing them through an elongate openable rigid enclosure 62 defining a tubular structure when assembled and attached.

Figure 2C:
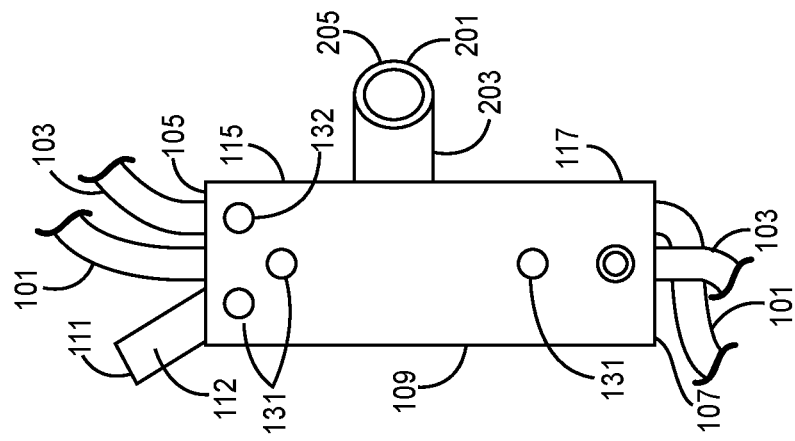
FIG. 2C is a back view of the hose guard of FIG. 2A.
Figure 2B:
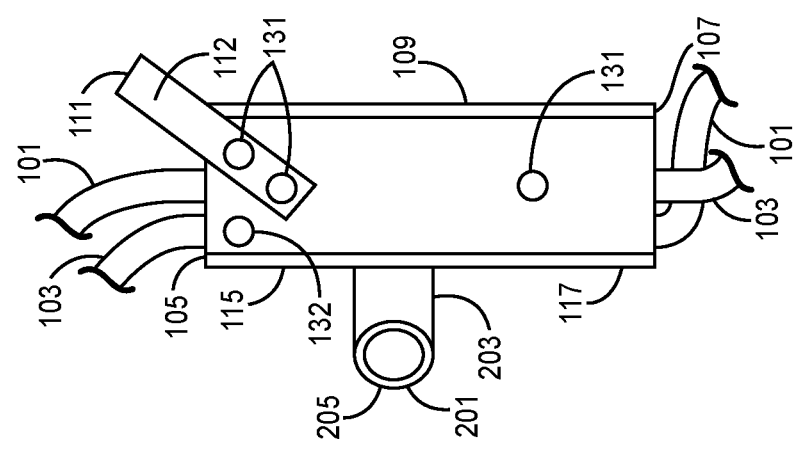
FIG. 2B is a front view the hose guard of FIG. 2A.
Figure 2A:
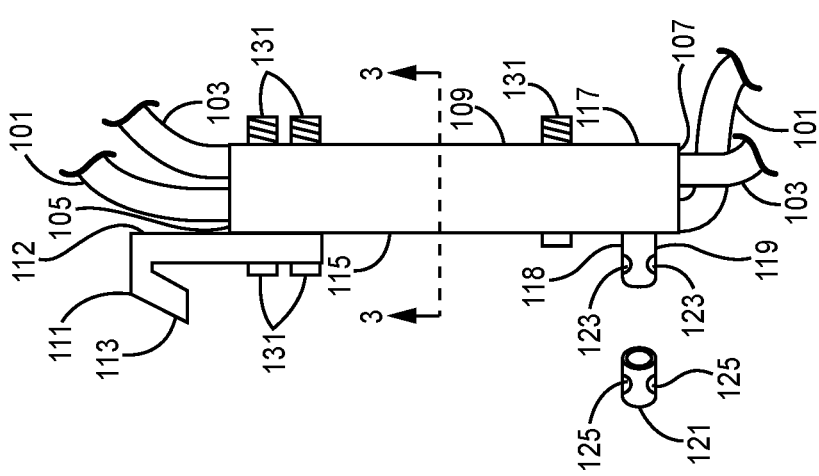
FIG. 2A is a side view of an embodiment of a hose guard.
Figure 4A:
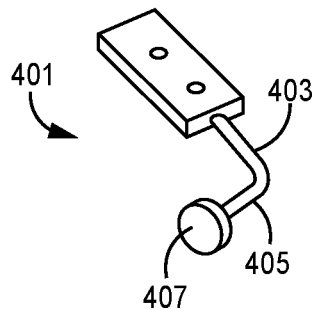
FIG. 4A is a perspective view of an optiona; bracket for securing a bottom portion of a hose guard to a vehicle according to embodiments of the invention.

FIG. 2A depicts a front view of protective bracket 100 with hose lines 101,103 extending from an open top end 105 of top portion 115 and an open bottom end 107 of bottom portion 117. Hose lines 101,103 pass through protective tubular body 109. Hose guard 100 has first attachment means 111 at top portion 115. In embodiments, first attachment means is hook 113. Most skid loaders have protrusions at or near the auxiliary hydraulic ports where hose lines 101,103 attach to the vehicle. For example, a protrusion could be a handlebar to facilitate entry to the vehicle cab. Another example of a protrusion could be a bracket adjacent the vehicle hydraulic ports. In embodiments, the bracket may be bolted or welded to the vehicle for supporting a hose guard. An example of such a bracket 401 is shown in FIG. 4A. Bracket 401 may be substantially "L" shaped and have a first leg 403 that may be affixed to the vehicle and a second leg 405 that is configured to receive hook 113. A cap 407 at the end of the second leg 405 may retain hook 113 on the second leg 405 between the cap and the first leg 403. Cap 407 may be a bent portion or protrusion, such as a disc, sufficient to retain hook 113 on the bracket 401. Hook 113 is configured to hang from a protrusion such that open top end 105 is adjacent or near the hydraulic ports.

In embodiments, when hook 113 is secured to the vehicle, open top end 105 is between 0.5 and 5 feet from the hydraulic ports. In embodiments, open top end 105 is less than 3 feet from the hydraulic ports. In embodiments, hook 113 may be integral with tubular body 109. In embodiments, hook 113 may be permanently affixed to tubular body 109, such as, for example, by welding. In embodiments, hook 113 may be removably attached to tubular body 109. For example, hook 113 may have an arm portion 112 that can be removably attached to tubular body 109 with one or more bolts 131 secured using through holes 132. In embodiments, through holes 132 may be positioned to allow placement of hook 113 in a variety of configurations. For example, through holes 132 may be positioned along the vertical axis of tubular body 109 such that upon attachment arm portion 112 is vertically aligned with tubular body 109. In embodiments, through holes 132 may be positioned askew to the vertical axis of tubular body 109. Such alignment may be beneficial so that tubular body 109 may be more readily aligned with the vehicle or may be in a better position to receive hose lines 101, 103 without placing undue stress on the lines, such as by sharp bends or kinks in the lines. In embodiments, hook arm 112 may be attached to various sides of tubular body 109. For example, hook arm might be attached to a front side, a left side, a right side, or a back side of tubular body 109. Particularly when tubular body 109 is rectangular, placement of the hook on a different side of the tubular body may allow for a better fit of the bracket with the vehicle and/or hose lines. In embodiments, hook 113 may be vertically adjustable such that open top end 105 is moved closer or farther from hook 113. Accordingly, by adjusting the height of hook 113, open top end 105 can be placed closer to the vehicle hydraulic port, minimizing the amount of exposed hydraulic hose 101, 103.

Figure 4B:
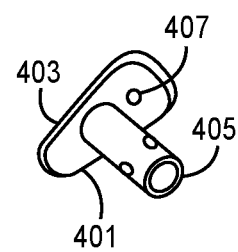
FIG. 4B is a perspective view of an optional bracket for securing a bottom portion of a hose guard to a vehicle according to embodiments of the invention.
Figure 5:
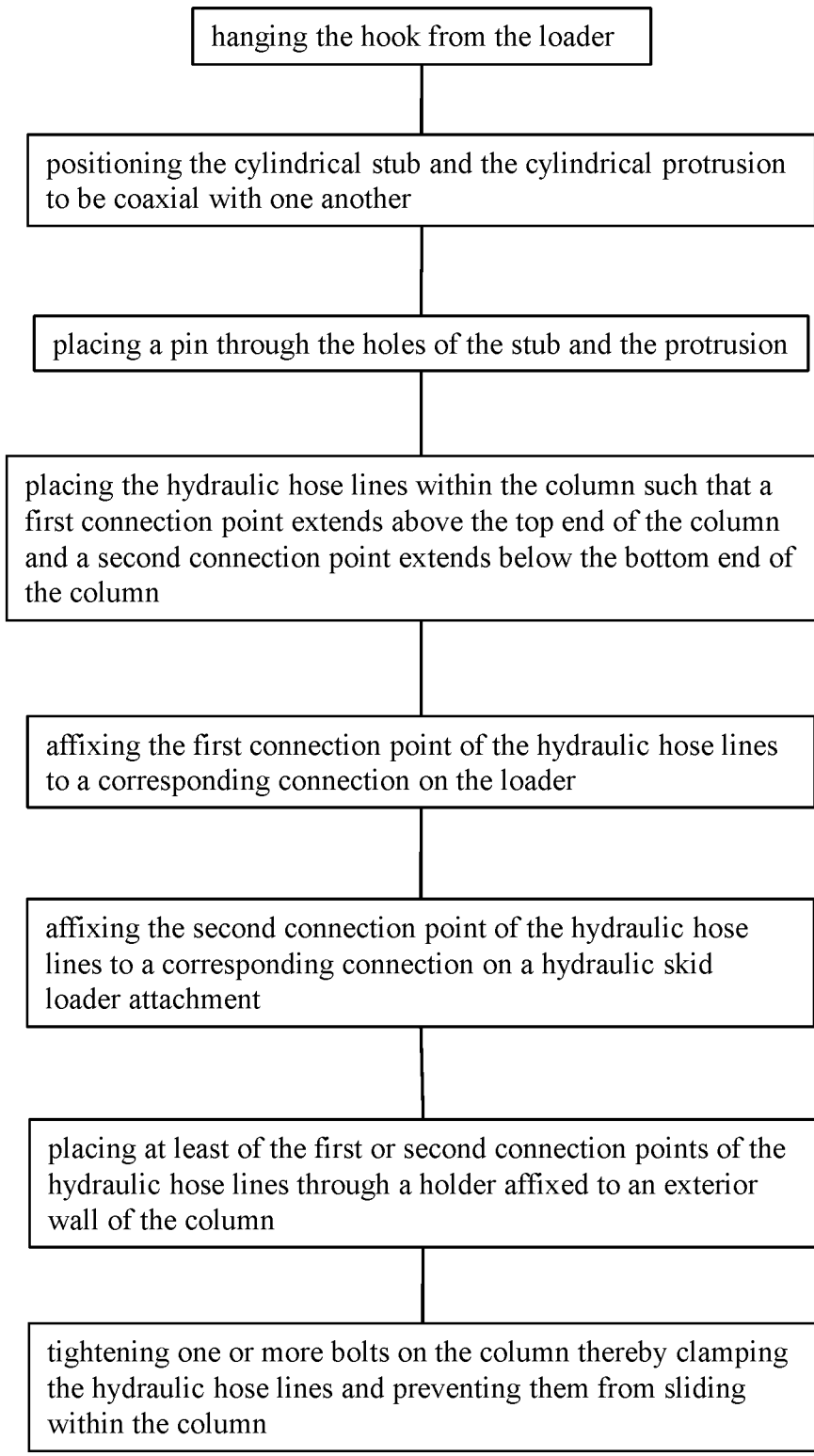
FIG. 5 is a flowchart depicting a method of using a hose guard according to embodiments of the invention.

Bottom portion 117 includes second attachment means 118 for attaching the bottom portion 117 to the vehicle. In embodiments, second attachment means 118 is a pipe stub 119 extending generally perpendicularly from an exterior surface of tubular body 109. Pipe stub 119 has one or more through holes 123. In embodiments, pipe stub 119 has two through holes 123, the through holes being directly opposite from one another. In embodiments, one or more through holes 123 are configured to receiving a pin, bolt, nut fastener, or the like. The vehicle has a corresponding receiving pipe 121 with one or more through holes 125. Through holes of receiving pipe 121 correspond to through holes of stub pipe 119 such that when stub pipe 119 and receiving pipe 121 are aligned, a pin or bolt may readily pass through all sets of through holes 123, 125, thereby securing bottom portion 117 to the vehicle. In embodiments, a diameter of receiving pipe 121 is slightly smaller than stub pipe 119, such that receiving pipe 121 fits within stub pipe 119. In embodiments, a diameter of receiving pipe 121 is slightly larger than stub pipe 119, such that stub pipe 119 fits within receiving pipe 121. When stub pipes 121 and 119 are coaxial with one another, through holes 123, 125 maybe radially aligned. Some vehicles may already have a receiving pipe 121 as a part of the vehicle body. Alternatively receiving pipe 121 may be part of a bracket designed to mount to the surface of a vehicle body, such as by a bolt. Typically a vehicle body, particularly the arms of the vehicle which are configured to interface with tools such as buckets, augers, or the like, have holes or bolts that are readily suited for receiving a mounting bracket. Such a bracket may be further shaped to readily fit the contours of the vehicle or vehicle arms. For example, FIG. 4B shows a bracket 401 with a wedge shaped mounting plate 403 and receiving pipe 405. Mounting plate may have one or more through holes 407 to mount bracket 401 onto a skid loader.

Figure 3A:
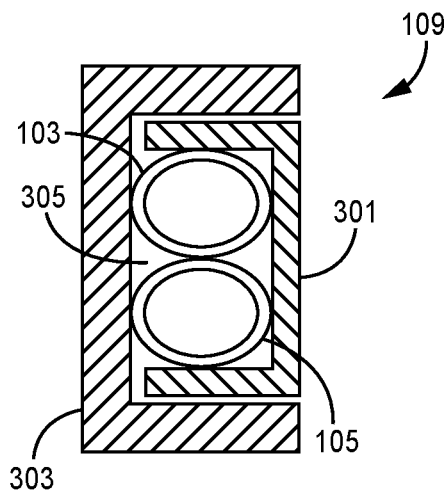
FIG. 3A is a cross-sectional view of the hose guard of FIG. 2A.
Figure 3B:
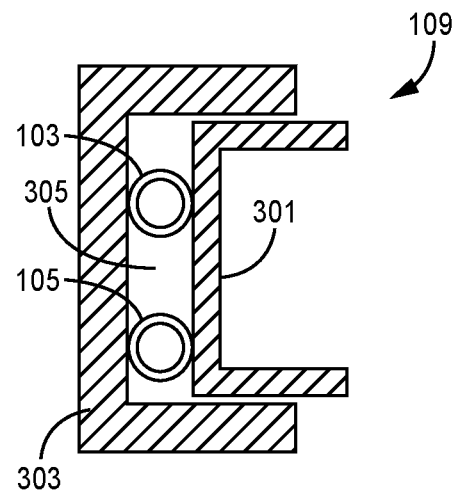
FIG. 3B is an alternative cross-sectional view of the hose guard of FIG. 2A.

In embodiments, tubular body 109 is a solid pipe. In embodiments, tubular body 109 has a circular cross section. In embodiments, tubular body 109 has a rectangular cross section. In embodiments, tubular body 109 may have one or more telescoping sections. As shown in FIG. 3A, tubular body 109 may have a small C-channel 301 that fits within a large channel 303, leaving an open central cavity 305. Hydraulic hoses 103,105 fit within central cavity 305. C-channels 301, 303 may be sized appropriately to surround more or fewer hoses as required. In embodiments, the cross section of central cavity 305 has an area of about 24 square inches. In embodiments, the cross section of central cavity 305 has an area of about 18 square inches. In embodiments, the cross section of central cavity 305 has an area between 12 and 36 square inches. In embodiments, central cavity 305 has a volume of between 500 and 1500 cubic inches. Small C-channel 301 may be secured to large C-channel 303 with one or more bolts 131. In such a configuration, small C-channel 301 and large C-channel 303 act as a clamp securely holding hose lines 103,105 in place. In embodiments, small C-channel 301 may be inverted when secured, as shown in FIG. 3B. Such a configuration may be useful, for example, when securing smaller hose lines 103, 105. Prior to tightening one or more bolts 131, hoses 103,105 may be adjusted so that there is an appropriate amount of slack extending from open top end 105 and open bottom end 107. Leaving an appropriate amount of slack prevents pinching or kinking which can have a negative impact on performance or damage the lines. This clamping mechanism further prevents the hose lines from moving once the clamp is tightening, preventing damage should the hose lines slip and entangle in the tires, tracks, attachment, or get snared by external items such as debris or protruding objects. The clamping mechanism also permits the tubular body 109 to accommodate a variety of hose sizes. It is also worth noting that some of the bolts used to secure the small and large C-channels to one another may serve to simultaneously secure the arm portion of the hook to the C-channel.

In embodiments, as illustrated in FIGS. 2B and 2C, hose guard 100 may include optional unattached holder 201. Unattached holder 201 may be used to hold ends of hose lines 101,103 when the hose lines are in an unused configuration and not attached to an attachment or the vehicle. Unattached holder 201 includes a stub pipe 203 with one end affixed to an exterior wall of tubular body 109 and an opposite end affixed to shaft 205. A central axis of shaft 205 is generally perpendicular to a central axis of tubular body 109. Unattached ends of hose lines 101,103 may be placed through openings of shaft 205. Accordingly, hose lines 101,103 are held in an uncompromised position when not attached, such as during transport of a tool attachment or during storage. In embodiments, unattached holder 201 may be permanently affixed to tubular body 109, for example, by welding. In embodiments, unattached holder 201 may be removably attached to tubular body 109, for example, by bolting it place. Other holders are not beyond the scope of this disclosure. For example, a holder may be a U-shaped or L-shaped arm or bracket affixed to the elongate rigid enclosure.

Tubular body 109 has a rigid structure to deflect and withstand damage from protruding objects or debris. In embodiments, tubular body 109 is metal. In embodiments, tubular body 109 is aluminum or aluminum alloys. In embodiments, tubular body 109 is extruded. In embodiments, tubular body 109 is steel. In embodiments, the wall thickness of the components of the metal Additional rigid structures are not beyond the scope of this disclosure. In alternative embodiments, tubular body 109 may be PVC or other similar rigid damage resistant materials. In embodiments, fixed connections may include welds, nails, glue, or the like. In embodiments, removable connections may include bolts, nuts, screws, and the like.

The hook attachment means facilitates installation of the hose guard by a single operator. In embodiments, the hose guard is sufficiently bulky and heavy that it would be difficult for a single operator to hold the hose guard in place while fastening bolts or the like. In embodiments, a hose guard weighs 20 or more pounds. In embodiments, a hose guard weighs between 15 and 25 pounds. In embodiments, a hose guard weighs between 10 and 30 pounds. Once the hook is secured to the vehicle, the hose guard is in a stable position whereby an operator can continue securing the guard and hoses. The bottom portion of the hose guard is attached to the vehicle by overlapping a shaft extending from the vehicle with a pipe stub extending from the bottom portion of the hose guard, aligning one or more apertures in the shaft with corresponding apertures in the stub, and securing the shaft and stub with a pin or bolt. Other means of securing the bottom portion to a vehicle, such as brackets or clamps, are not beyond the scope of this disclosure. The hoses can be fed through the central shaft of the tubular body. Once the hoses are positioned, one or more bolts along the tubular body can be tightened, clamping the hoses in place. If the hoses are too loose, they could slip down and be damaged by the vehicle tires or tracks, or be exposed to other debris or protrusions. Before the hoses are clamped, they can be adjusted so there is an appropriate amount of slack at the top and bottom, thereby avoiding pinching or kinking. When in use, one end of the hoses are connected to corresponding hydraulic ports on the vehicle, and the opposite end of the hoses are attached to ports on the attachment tool. When not in use, either or both ends of the hose may be fed through a holder on the side of the hose guard. The holder keeps the hoses easily accessible and in an uncompromised position, without requiring removing the entire hose guard from the vehicle.

The following U.S. patents and U.S. patent publications contain content, aspects, components and functionalities relating to or applicable to skid steers with wheels and/or tracks and are incorporated by reference herein in their entireties for all purposes: U.S. Pat. Nos. 4,955,455; 7,156,200; and US Patent Publication 20210087788.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A hose guard for a skid loader attachment comprising:
   an elongate rigid enclosure defining a central cavity, the elongate rigid enclosure having an opening at a first top end and an opening at an opposite second end;
   a suspension hook affixed to the first top end of the elongate rigid enclosure configured to hang the first end of the elongate rigid enclosure from a projection extending from the skid loader; and
   an attachment means at the second end of the elongate rigid enclosure, the attachment means configured to secure the second end of the elongate rigid enclosure to the skid loader,
   wherein the suspension hook comprises an arm portion and a hanging hook portion, the arm portion having a lower section and an upper section, the lower section partially overlapping and affixed to the elongate rigid enclosure at an adjustable connection allowing for variation in angles between the lower section and the elongate rigid enclosure, and the upper section projecting upwardly and extending beyond the opening at the first top end of the elongate rigid enclosure, the upper section terminating at the hanging hook portion.

2. The hose guard of claim 1, further comprising a holder affixed to a sidewall of the elongate rigid enclosure between the first and second ends.

3. The hose guard of claim 2, wherein the holder is a pipe affixed to an outward facing side of the elongate rigid enclosure.

4. The hose guard of claim 3, wherein a central axis of the holder is perpendicular to a central axis of the elongate rigid enclosure.

5. The hose guard of claim 1, wherein the attachment means is a stub of pipe defining a hole, wherein the stub of pipe is configured to interface with the skid loader such that placing a pin through the hole secures the stub of pipe to the skid loader.

6. The hose guard of claim 1, wherein a cross section of the elongate rigid enclosure is rectangular.

7. The hose guard of claim 1, wherein the elongate rigid enclosure comprises a first C-channel and a second C-channel, each of the C-channels having a back side and two legs forming a "C" shape, wherein the back side and two legs of the second C-channel each have a width shorter than the corresponding back side and two legs of the first C-channel, such that the two legs of the second C-channel fit within the two legs of the first C-channel.

8. The hose guard of claim 7, wherein an interior cavity of the of the elongate rigid enclosure is defined by the back side of the first C-channel, the back side of the second C-channel, and overlapping portions of the legs of the first and second C-channels.

9. The hose guard of claim 7, wherein the first and second C-channel are secured to one another with one or more removable fasteners.

10. The hose guard of claim 9, wherein the one or more removable fasteners are bolts.

11. The hose guard of claim 1, wherein the elongate rigid enclosure is extruded.

12. The hose guard of claim 1, wherein the elongate rigid enclosure is metal.

13. The hose guard of claim 1, wherein the elongate rigid enclosure is steel.

14. A universal rigid hose guard for protecting hydraulic hose lines of a skid steer between a skid steer hose line attachment point and a pivot point at a bottom of a skid steer loader arm comprising:
   a column having an open top end and an open bottom end, the column defining an interior chamber, such that the hydraulic hose lines of the skid steer enter the chamber through the top end and exit through the bottom end;
   a hook extending upwardly from the top end of the column;
   a cylindrical protrusion extending radially outward from the bottom end of the column, the protrusion having a wall defining a first hole opposite a second hole, the protrusion interfacing with a cylindrical stub on an exterior surface of the skid loader, the stub defining a first hole opposite a second hole, such that when interfaced the holes axially align and a pin positioned in the aligned holes secures the cylindrical protrusion to the cylindrical stub.

15. The universal rigid hose guard of claim 14, wherein the cylindrical protrusion has a larger diameter than the cylindrical stub such that the stub fits within a portion of the protrusion.

16. A method of using the universal rigid hose guard of claim 14 comprising:

hanging the hook from the loader;
positioning the cylindrical stub and the cylindrical protrusion to be coaxial with one another;
placing the pin through the holes of the stub and the protrusion; and
placing the hydraulic hose lines within the column such that a first connection point extends above the top end of the column and a second connection point extends below the bottom end of the column.

17. The method of claim 16 further comprising:
affixing the first connection point of the hydraulic hose lines to a corresponding connection on the loader; and
affixing the second connection point of the hydraulic hose lines to a corresponding connection on a hydraulic skid loader attachment.

18. The method of claim 17 further comprising:
placing at least of the first or second connection points of the hydraulic hose lines through a holder affixed to an exterior wall of the column.

19. The method of claim 18 further comprising:
tightening one or more bolts on the column thereby clamping the hydraulic hose lines and preventing them from sliding within the column.

20. The hose guard of claim 1, wherein the lower section of the suspension hook is askew to the elongate rigid enclosure when the suspension hook is affixed to the elongate rigid enclosure.

* * * * *